United States Patent [19]

Rogers et al.

[11] Patent Number: 4,936,054

[45] Date of Patent: Jun. 26, 1990

[54] METHOD AND APPARATUS FOR IMPROVED TIRE UNIFORMITY

[75] Inventors: Clarence L. Rogers, Hartville; Farhad Tabaddor, Akron, both of Ohio

[73] Assignee: The Uniroyal Goodrich Tire Company, Akron, Ohio

[21] Appl. No.: 355,591

[22] Filed: May 23, 1989

[51] Int. Cl.⁵ .............................................. B24B 49/04
[52] U.S. Cl. ................................ 51/165 R; 51/106 R; 51/DIG. 33
[58] Field of Search ............. 51/106 R, 165 R, 289 R, 51/281 R, DIG. 33; 318/590

[56] References Cited

U.S. PATENT DOCUMENTS

| 3,681,877 | 8/1972 | Shively et al. | 51/106 R |
| 3,817,003 | 6/1974 | Monajjem | 51/106 R |
| 3,849,942 | 11/1974 | Monajjem | 51/106 R |
| 4,047,338 | 9/1977 | Gormish et al. | 51/106 R |
| 4,241,300 | 12/1980 | Hayes et al. | 51/106 R |

Primary Examiner—Robert P. Olszewski
Assistant Examiner—Mark F. Frazier
Attorney, Agent, or Firm—Michael J. Colitz, Jr.; Alan A. Csontos; Greg Strugalski

[57] ABSTRACT

An improved of processing a tire on a uniformity machine comprising the steps of sensing the radial force variations in a tire and generating a composite waveform corresponding to the sensed force variations, converting the composite waveform into a special function waveform selected from the class of waveforms which includes filtered partial square waves, partial sine waves and full sine waves, selecting either from a table or adaptively one of the special function waveforms and grinding of the tire in response to the selected special function waveform.

19 Claims, 6 Drawing Sheets

SAMPLE PERIOD – 4 RUNS
MAGNIFICATION – $V_X = -7.81$ mV
MAGNIFY ABOUT – $V_O = -7.81$ mV
CURSOR MOVES – $V_O - V_X = 0.00$ mV

SAMPLE PERIOD – 3 RUNS
MAGNIFICATION – $V_X = 2.17$ V
MAGNIFY ABOUT – $V_O = 2.07$ V
CURSOR MOVES – $V_X - V_O = 93.7$ mV

METHOD AND APPARATUS FOR IMPROVED TIRE UNIFORMITY

BACKGROUND OF THE INVENTION

This invention relates to the processing of tires for uniformity correction and, more particularly, to methods and apparatus for testing tires for force variation in which special function waveforms are generated including an optimum grind waveform and in which the grinding is predictive and adaptive.

DESCRIPTION OF THE BACKGROUND ART

In the art of manufacturing pneumatic tires, various components such as belts, beads, liners, treads, piles of rubberized cords, and the like are sequentially assembled. During the assembling process, structural non-uniformities may occur. When such non-uniformities are of sufficient magnitude, they will cause force variations on a surface, such as a road, against which the tires roll. As a result, vibrational and acoustical disturbances in the vehicle are created in the vehicle upon which the tires are mounted.

Force variations are anomalies which result from "hard" and/or "soft" spots in the tires caused by structural non-uniformities such as inconsistent wall thicknesses, ply turn up variations, bead sets, ply arrangement and other deviations. Regardless of the cause of force variations, when such variations exceed the acceptable minimal level, the ride of a vehicle utilizing such tires will be adversely affected.

Excessive radial force variations may be eliminated or reduced to an acceptable level by processing on a tire uniformity machine. Typical examples of known tire uniformity machines are described in the prior patent literature. In U.S. Pat. No. 3,574,973 to Rader, an inflated tire is mounted for rotation about a vertical axis. Parallel with the first vertical axis is a road simulation wheel mounted for rotation about a second axis, parallel to the first. The roadwheel is adapted to contact, and be rotated by, the rotating tire. Sensors associated with a roadwheel determine when hard spots of the tire are rotated into contact with a road since increased force is sensed at the roadwheel. Conversely, lower force areas or soft spots on the tire will also be detected by the force sensors associated with a roadwheel. The electrical output signals from the sensors are fed through an electronic processor which will evaluate the sensed information to drive grinding wheels or stones into contact with selected portions of the tread surface of the rotating tire at predetermined times and to predetermined depths. The grinding wheels will then grind the appropriate patches of rubber from the tire until sufficient rubber has been removed from the hard spots to render the tire sufficiently devoid of high radial force variations. The result is improved tire performance.

Each revolution of the tire contributes to producing a composite electrical signal. The grinding wheels are actuated to be pulsed into contact with the tire in accordance with such signal each time a spot of excessive hardness of the tire is adjacent the grind wheel. In such process, the composite output signal is compared against an acceptable standard limit to produce a grind patch or patches around the periphery of the tire.

In a subsequent patent, U.S. Pat. No. 4,458,451 to Rogers, the electrical output from the sensor is filtered electronically to generate a sine wave representing the radial harmonic of the sensed signals. In addition, Rogers discloses comparing the output of the sensors, whether of the composite variety of Rader or of the radial harmonic variety of Rogers, against the percentage of the peak-to-peak variation in the generated waveform. In such arrangement, the grinding of the tire is in a single patch of an extended length for each revolution of the tire.

A further patent, U.S. Pat. No. 4,669,228 to Rogers discloses an additional improvement wherein the grinders are independently mounted and independently movable in response as to independent signals from each shoulder of the tire.

As illustrated by the great number of prior patents and commercial devices, efforts are continuously being made in an attempt to more efficiently correct tire non-uniformity. None of these prior art efforts, however, suggests the present inventive combination of method steps and component elements arranged and configured for correcting tire tire-uniformity wherein such non-uniformity is detected and converted to special function force signals such as partial square waves, partial sine waves, full sine waves or the like. Further, none of such prior art methods and apparatus disclose the generation of optimal waveforms by combining special function waveforms and none of the prior art methods and apparatus provide for adaptive and predictive grinding methods.

Prior art methods and apparatus simply do not provide the benefits of the present invention which achieves its intended purposes, objectives and advantages over the prior art through a new, useful and unobvious combination of method steps and component elements, through no increase in the number of functioning parts, at a reduction in operating cost, and through the utilization of only readily available materials and conventional components.

Therefore, it is an object of the present invention to provide an improved method of processing a tire uniformity machine comprising the steps of sensing the radial force variations in a tire and generating a composite waveform corresponding to the sensed force variations, converting the composite waveform into a special function waveform selected from the class of waveforms which includes filtered partial square waves and partial sine waves as well as full sine waves, selecting either from a table or adaptively one of the special function waveforms and grinding of the tire in response to the selected special function waveform.

It is a further object of this invention to selectively remove both composite or harmonic radial force variation from tires more rapidly and more efficiently during the uniformity correction process.

Lastly, it is an object of the subject invention to render processed tires more uniform in radial force variations and more pleasing in appearance.

The foregoing has outlined some of the more pertinent objects of the invention. These objects and advantages should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The present invention is defined by the appended claims with the specific embodiment shown in the attached drawings. For the purposes of summarizing the invention, the invention may be incorporated into an improved a method of processing a tire comprising the steps of sensing force variations in the tire to be processed, creating a first waveform which is a composite of the sensed force variations in the sensed tire, separating the first waveform into a plurality of second waveforms which are special waveforms corresponding to intended specifications of the tire to be processed, generating third waveforms which are functions of the second waveforms, combining the third waveforms into a fourth waveform; and grinding the tire to be processed in a pattern as determined by the fourth waveform, the plurality of second waveforms include composite, first harmonic, second harmonic through the nth harmonic, the third waveforms include excess composite waveforms, partial harmonic waveforms, full harmonic waveforms and 180 degree sine waveforms. The method further includes the steps of modifying at least one of the waveforms as a function of the process results from the processing of prior tires. The modifying is done to the fourth waveform. The method further includes the step of determining the position of the tire being processed with respect to the grinding means and off-setting at least one of the waveforms as a function of such determined position. The force variations being sensed are radial force variations or may be the radial run-out induced variations.

The invention may also be incorporated into a method of processing a tire comprising the steps of sensing the radial force variations in the tire to be processed, creating a first waveform which is a composite of the sensed force variations in the sensed tire, separating the first waveform into a plurality of second waveforms which are special waveforms corresponding to intended specifications of the tire to be processed, generating third waveforms which are functions of the second waveforms, combining the third waveforms into a fourth waveform, modifying the fourth waveform as a function of the process results from the processing of prior tires, off-setting all of the waveforms as a function of the position of the tire being processed with respect to the grinding means; and grinding the tire to be processed in a pattern as is determined by the fourth waveform.

Further, the invention may be incorporated into an apparatus for processing a tire comprising in combination means to sense force variations in the tire to be processed means to create a first waveform which is a composite of the sensed force variations in the sensed tire, means to separate the first waveform into a plurality of second waveforms which are special waveforms corresponding to intended specifications of the tire to be processed; means to generate third waveforms which are functions of the second waveforms, means to combine the third waveforms into a fourth waveform, and means to grind the tire to be processed in a pattern as determined by the fourth waveform. The plurality of second waveforms include composite, first harmonic, second harmonic through the nth harmonic. The third waveforms include excess composite waveforms, partial harmonic waveforms, full harmonic waveforms and 180 degree sign waveforms. The apparatus further includes means to modify at least one of the waveforms as a function of the process results from the processing of prior tires and the means to modify acts upon the fourth waveform. The apparatus further includes means to determine the position of the tire being processed with respect to the grinding means and means to off-set at least one of the waveforms as a function of such determined position The force variations being sensed are radial force variations or may be the radial run-out induced variations.

In addition, the invention may be incorporated into apparatus for processing a tire comprising in combination means for sensing radial force variations in the tire to be processed, means for creating a first waveform which is a composite of the force variations in the sensed tire, means for separating the first waveform into a plurality of second waveforms which are special waveforms corresponding to intended specifications of the tire to be processed, means for generating third waveforms which are functions of the second waveforms, means for combining the third waveforms into a fourth waveform means for modifying the fourth waveform as a function of the process results from the processing of prior tires, means for determining the positioning of the tire being processed with respect to the grinding means and off-setting all of the waveforms as a function of such determined position, and grinding the tire to be processed in a pattern as determined by the fourth waveform.

Lastly, the invention may be incorporated into a method of processing a rotating tire comprising the steps of sensing force variations in the rotating tire to be processed, creating an initial waveform which is a composite of the sensed force variations in the rotating tire, separating the initial waveform into a plurality of intermediate waveforms, processing at least some of the intermediate waveforms, combining the proposed waveforms into a final waveform, and grinding the rotating tire to be processed in a pattern as determined by the final waveform.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects and advantages of the present invention, reference should be had to the following detailed description taken in conjunction with the accompanying drawings in which.

Similar referenced characters refer to similar parts throughout the several Figures.

DETAILED DESCRIPTION OF THE INVENTION

Overview

Figure 1:
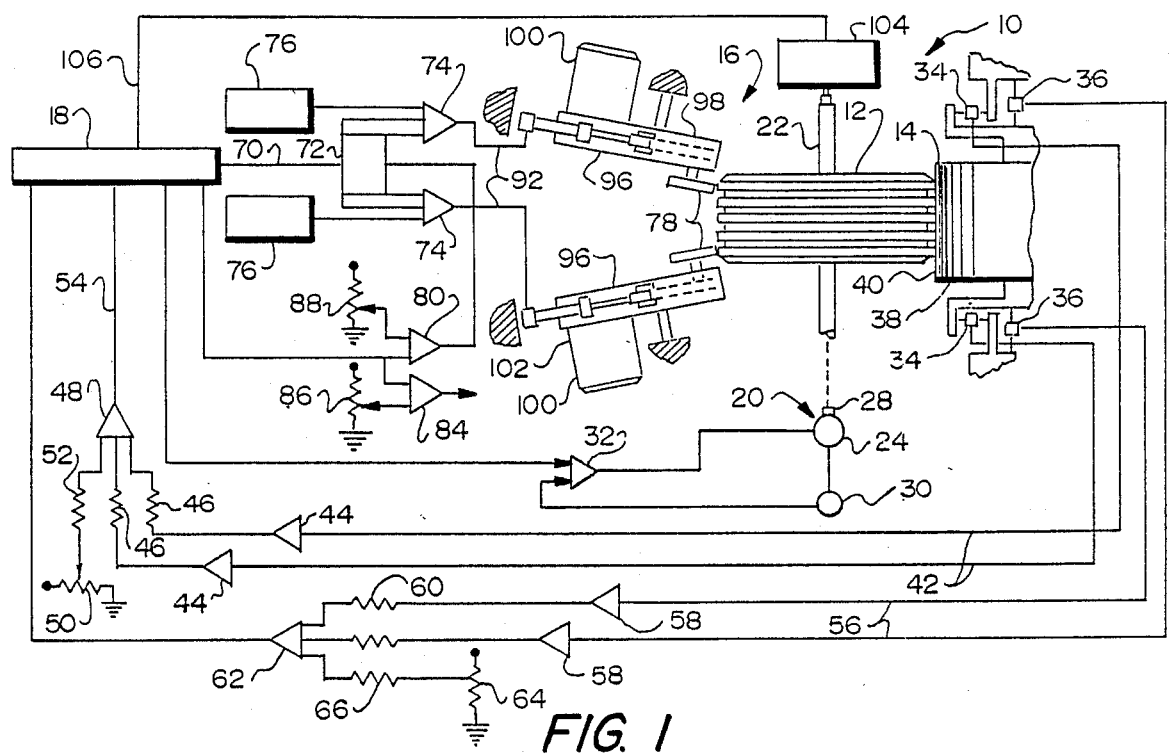
FIG. 1 is a schematic illustration of a tire uniformity machine for detecting, measuring and reducing force variations in a pneumatic tire.
Figure 2:
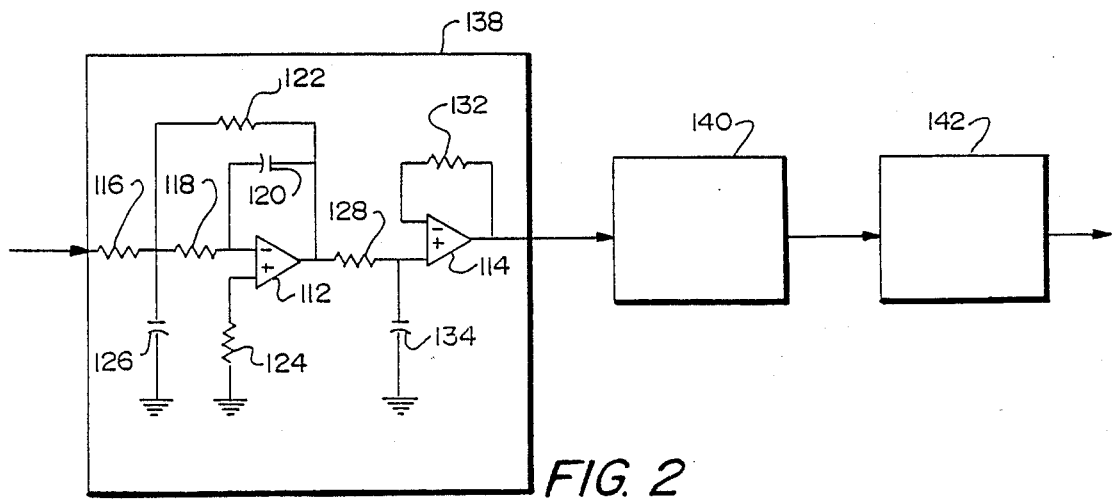
FIG. 2 is an electrical diagram illustrating certain details of the electronic processor.

In FIG. 1, there is shown by schematic representation a tire uniformity machine 10 which operates to reduce radial force variations in a pneumatic tire 12 in a more efficient manner than was previously possible. The tire uniformity machine 10 includes a detection assembly 14 to sense and measure force variations in a tire, a rubber removal assembly 16 to remove rubber from the tire 12, an electronic processor 18 to process signals received from the detection assembly and a motor 20 for rotating the pneumatic tire. The motor 20 includes a rim upon which the tire is mounted. The rim is carried on a spindle 22 turned by a rotary drive means 24.

The assembly 14 to detect and measure radial force variations in the tire includes a pair of load cells 34 and 36 and a loadwheel 38. The loadwheel has a cylindrical surface 40 upon which the tire 12 rotates for imparting rotation to the loadwheel. The loadwheel is adapted for free rotation about a non-rotating axle spaced from, but parallel with, the axis of rotation of the tire. The axle upon which the loadwheel 38 rotates is adjustably mounted so that it may be positioned closer to, or farther from, the axis of rotation of the tire. In this manner, a predetermined deflecting load may be set up against the tire 12 by the surface 40 of the loadwheel 38.

Operatively coupled to the loadwheel 38 is the pair of load cells 34 and 36 which contain sensors such as strain gauges for measuring the forces exerted on the loadwheel by the rotating tire in both the radial and lateral directions. The load cells 34 convert the radial force variation measurements to electrical signals such as voltage level signals which are fed via lines 42 through the electronic processor 18.

During the sensing phase, the electronic processor 18 receives, processes and interprets the radial force variation signals, and stores the interpreted signals in its memory. Later, during the grinding phase, the electronic processor 18 produces a control signal for controlling the grinding of the tire as a function of the stored radial and lateral force variation signals. The electronic processor will be described in greater detail hereinafter.

The output of the electronic processor 18 includes a control signal on line 70 which is sent to a nodal point 72. There the signal is divided into two control signals. The two control signals are fed into servo amplifiers 74 wherein they are each summed with signals from skim sensors 76 which measure and control the non-grinding distance between the grinding wheels 78 an the shoulders of the tire 12.

The skim sensors may be conventional paddles which push against the tire during the sensing phase. When the tire gets larger in diameter due to excessive force variations, the tire pushes out the adjacent paddle which, in turn, generates a signal to servo amplifiers 74 to move the grinders to positions toward or away from the tire being ground. The paddles are located on the shoulders of the tire immediately in front of the grinders or on the center ribs or full face of the tire as applicable.

A signal from the electronic processor 18 also passes through line 82 to a grind classifier 80 and to a scrap classifier 84. A scrap limit potentiometer 86 establishes a preselected value for a maximum limit detection so that if the electronic processor signal exceeds the preselected value, the tire will be considered non-correctable, no grinding will occur and the tire will be dismounted from the tire uniformity machine 10. If the tire is not non-correctable, the grind classifier 80 will compare the signal with a voltage from a grind limit potentiometer 88 to determine whether additional grinding is required. If the tire is at or below the minimum level and no additional grinding is required, the signal of line 90 is summed in the servo amplifiers 74 effecting retraction of the grinding wheels 78. If the measured radial force value of the tire is between the upper and lower limits, the signal summed in the servo amplifiers 74 is converted to a hydraulic control signal. Such hydraulic control signal is passed through lines 92 to the rubber removing means 16 which is typically comprised of the two grinders 96.

The two grinders 96 include frames 98 which support electric motors 100, hydraulic systems 102 and grinding wheels 78. The frames 98 are pivotably mounted on the fixed portions of the machine 10 with suitable devices such as pins to allow for each grinder 98 to pivot toward or away from the shoulder of the tire 10.

The electronic processor 18 also has an input signal from the angle encoder 104 along a line 106. The angle encoder is suitably attached to the spindle 22 for determining the angular position of the tire. The signal from the angle encoder 104 to the electronic processor 18 coordinates the location of the grinding of the tire and takes into account the angle difference between where the tire touches the loadwheel 38 and where the tire touches the grinders 96.

The tire 12 is tested for radial force variations. The magnitude of the force variations is detected and measured, preferably within a single revolution. Thereafter, the electronic processor will compare the magnitude of the peak-to-peak radial force variations with specified grading levels. The electronic processor will then decide whether a grind is necessary. If a grind is required, the electronic processor will signal the motor to the rubber removal means 16 to remove selected amounts of rubber from selected regions of the tire in a programmed manner.

The electrical signals provided to the electronic processor 18 include data samples for a complete test revolution of the tire. Each sample represents a separate measurement of the force variation at a different angle. A measurement of the force variation at each degree increment of the tire is thereby specifically referenced to an angle location by the angle encoder 104. The total number of samples per revolution form a synthesized composite waveform which is fed into the electronic processor where a preselected analysis calculation of a cyclic function is performed.

A composite waveform is composed of one or more harmonically related sine waves. The lowest frequency is called the first harmonic. All other harmonics are integrally related to the first by an integer number, i.e., 2, 3, 4, 5, etc. When all such harmonic waves are added together, a composite waveform, the original waveform, is created. The Fourier spectrum of a composite waveform is, thus, the amplitudes of the first, second, third, fourth, fifth, etc. harmonics which, when added together, make up the composite waveform. The harmonic waveforms have a specific phase relationship with each other so that when they are added together, their sums equal the composite.

The electronic processor also functions to determine the first harmonic high point of force which is calculated from the composite waveform. The composite peak-to-peak force is also calculated by comparison of the sequential force measurements obtained during one or more test revolutions.

The electronic processor 18 also compares the harmonic peak-to-peak and the composite peak-to-peak values calculated from a test cycle with a predetermined acceptable grading levels. If the radial harmonic peak-to-peak and the radial composite peak-to-peak are less than a predetermined acceptable grading level (normally called the first limit), no correction is needed. The tire is satisfactory and ready for use, and it is removed from the machine 10. If either or both the harmonic peak-to-peak and composite peak-to-peak exceed a second limit as determined by the scrap classifier 84 and the scrap limit potentiometer 86, the tire has force variations that cannot be corrected by grinding to bring either the radial harmonic peak-to-peak or the radial composite peak-to-peak force variations within the predetermined acceptable range (without excessive rubber removal) If the radial harmonic peak-to-peak force variation and radial composite peak-to-peak force variation fall within the acceptable grindable range of either or both (between the first limit and the second limit) without either exceeding the second limit, a preselected grinding procedure is performed to reduce the radial force variations.

The electronic processor 18 also utilizes a grinder displacement angle which is the difference in degrees between the loadwheel 38 and the location of the grinders 96 and 98. At this time we are presuming a compute machine configuration which tests at one speed and grinds at another. In addition to the grinder displacement angle, a fixed number of milliseconds prior to the grind may be set which would allow for the reduction of the speed of the rotating tire while the electronic processor receives the signal along line 106 from the angle encoder 104. Also, a signal may be sent from the electronic processor 18 along line 108 to the motor driver 32 which, in turn, would allow for the grinder to be located at the leading edge of the desired grind patch either prior to or at the time the spindle speed is reduced to the desired grind speed.

A grind signal is sent from the electronic processor 18 along the line 70 to a nodal point 72 wherein the signal is divided into two signals. Each of the signals passes through a servo amplifier 74 wherein the signal is converted to a hydraulic signal which is passed through lines 92 to bring the grinding wheel(S) 78 into grinding engagement with the leading edge of the grind patch of the tire. In the mode of grinding, which may be termed composite grinding, the grind patch consists of all parts of the tire corresponding to angles of the tire which contain force variation values greater than a constant value of a calculated limit which is generally termed the suppressed limit. In a preferred usage, radial composite "suppressed limit" is calculated as a fixed number of pounds, usually from five (5) to eight (8), less than the radial composite first limit. In like manner radial first harmonic and second harmonic suppressed limits are calculated from the radial first harmonic and radial second harmonic first limits. The amount the tire is ground is determined by the amount that measured tire force variation, when referenced to its soft spot, is greater than the suppressed limit.

The electronic processor 18 is programmed to determine a grind patch which corresponds to the minimum angle of tire rotation during grind. One means used to attain the minimum angle of rotation is to start at the calculated radial soft spot and compare sequential force variations with the appropriate suppressed limit as measured both in a clockwise and a counterclockwise direction from the soft spot. The total angle subtended before exceeding the suppressed limit in both directions is termed the no-grind portion of the tire. The remaining angular portion of the tire corresponds to the desired grind patch which is normally 180 degrees or less.

Upon completion of grinding the grind patch, the grinder is withdrawn from the tire. A determination as to any further grinding may again be made by retesting the tire. If no further grinding is required, the rotating tire is stopped and the tire is ejected from the tire uniformity machine 10.

In an alternate method of grinding, generally termed harmonic grinding, the grind output for harmonic correction is constructed in the electronic processor and its the real time difference between the synthesized harmonic function and a harmonic suppressed limit. The synthesized harmonic function is calculated from the magnitude of the harmonic peak-to-peak force and the phase of the harmonic force as calculated by the Fourier methods referenced above. The grind output calculation determines a grind patch which is of equal lengths on both sides of the harmonic high point. The grind patch is normally less than or equal to 180 degrees.

Further details of the method of operation of coupling the output of the circuitry to the grinders is described in the aforementioned U.S. Pat. No. 4,669,228 to Rogers.

Electronic techniques for sensing the peak-to-peak variation of the signals and for comparing the electrical output of the signals to the peak-to-peak is described in the aforementioned U.S. Pat. No. 4,458,451 to Rogers and Duffy. In addition, such patent to Rogers and Duffy describes the techniques for filtering the composite signal and converting it to a radial harmonic signal.

Insofar as the mechanical description of the sensors and grinders is concerned, such description is essentially the same as that described in the aforementioned patent applications assigned to the assignee of the present invention. According to the present invention, however, the electronic controls which receive the composite signal from the sensors are different as they are processed to create the grind command signal for use in controlling the grinders. More specifically, the electronic controls modify the initially generated composite signal and perform various steps including creating (a) a first composite waveform, (b) second waveforms formed from the separation of the first waveform and which are special waveforms corresponding to the intended specifications of the tire to be processed, and (c) third waveforms which are functions of the second waveform and (d) a fourth waveform which is a combination of the third waveforms. This is all in a manner which produces superior tires and may effect the grinding with a single grind sequence instead of the multiple sequential grind sequences as was necessary in the prior art. This provides great economy and savings in terms of time and money.

The control sequence described herein may be used to modify essentially any commercially available computer in industry today. The modifications of such computer for effecting the intended results herein could be done by a wide variety of programming variations. The particular programming described herein is of a preferred form but other forms could be utilized to effect the intended results in accordance with the teachings herein of the present invention.

In accordance with the present disclosure, the radial force signals may be converted to special function signals which may be utilized for directing the grinding of the tire. Such special force functions include the partial square wave, the partial sine wave and the full sine wave.

Higher Harmonic Force Correction

Selective reduction of higher harmonic forces or runout variation is performed by uniformity machines using 180 degree grinding methods. The higher harmonic filter is substituted for the first harmonic filter and suitable delay compensations are made. With the 180 degree grind, there is no introduction of subharmonics.

Figure 3:
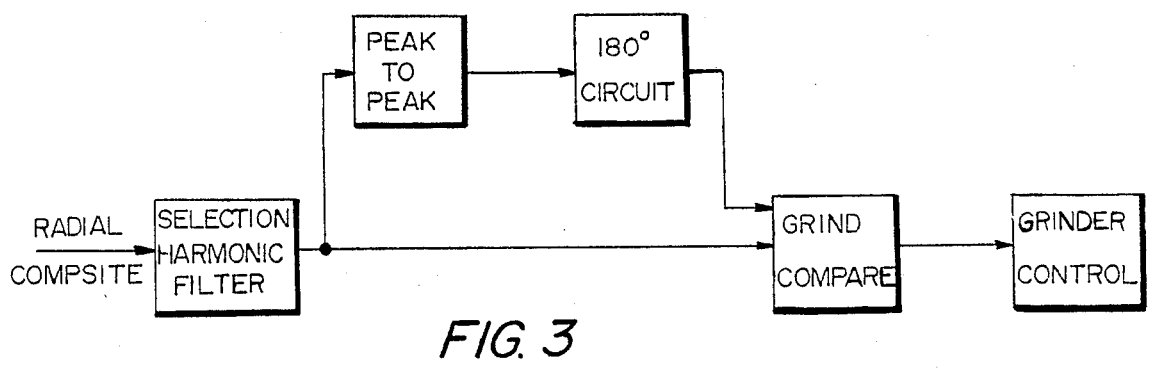
FIG. 3 is a diagrammatic view of a preferred electronic processor for use in the machinery of FIG. 1.

This method is of advantage where the match between the tire and the car is such that the particular harmonic of the tire is troublesome. This harmonic can be selectively eliminated with the apparatus shown in FIG. 3.

Special Function Force Correction

Special function force correction circuitry is employed which permits the processor to either select from a table or select adaptively either the partial square wave, the partial sine wave, or the full sine wave method of grinding a tire.

Figure 4:
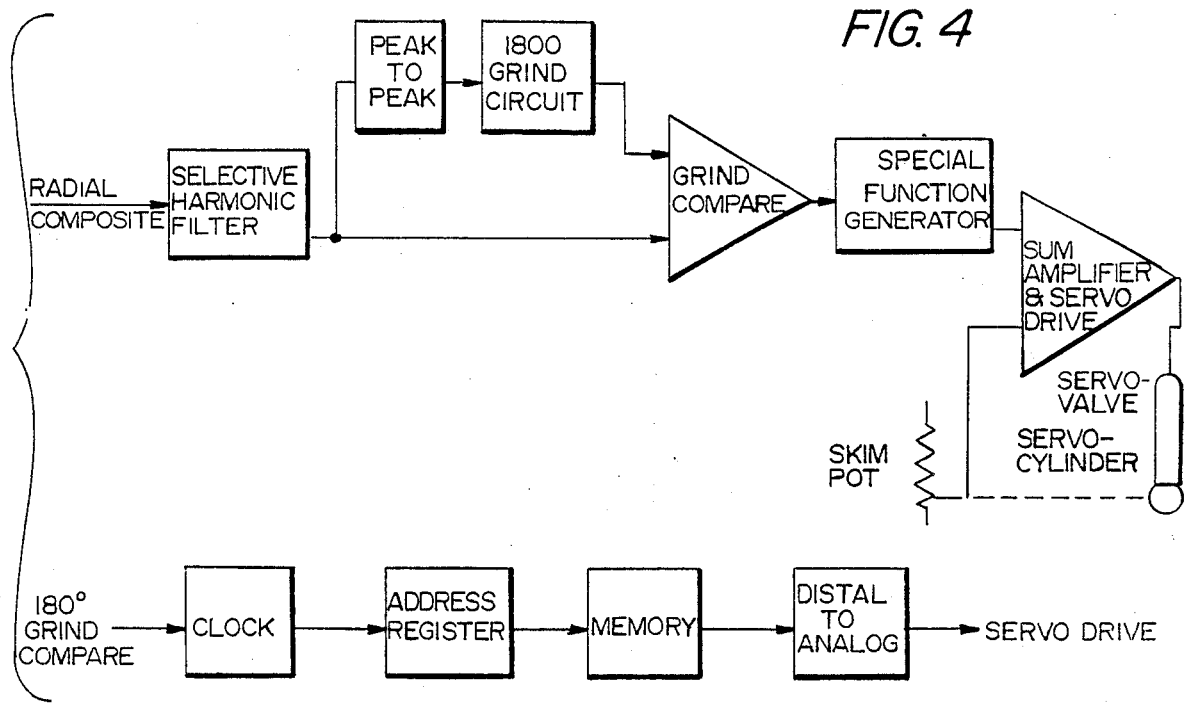
FIG. 4 is an electrical block diagram of the special function force correction means and special function generator.
Figure 5:
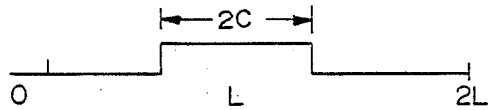
FIG. 5 is a graph of the 180 degree grind mode.
Figure 6:
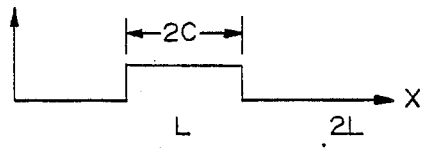
FIG. 6 is a graph of the square wave of the Fourier expansion of the 180 degree square wave.
Figure 7:
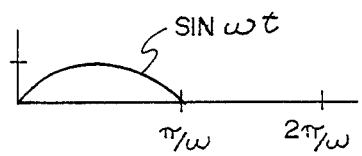
FIG. 7 is a half sine wave grind function.
Figure 8:
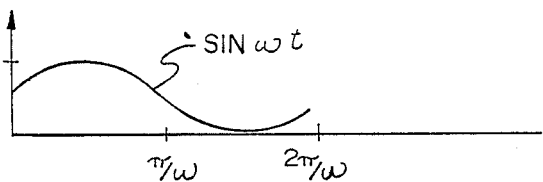
FIG. 8 is a graph of a full sine wave grind function.

The full sine wave and the half sine wave functions are respectively applicable to processes where zero harmonic induction is required or for processes where cosmetic grinding with minimum rubber removal is desired. FIG. 4 shows circuitry for effecting such results. FIG. 5 is a graphical representation. In considering higher harmonic generation with various grind modes, the 180 degree grind only, odd harmonics are generated and the value of the third harmonic is induced equal to one-third the value of the first harmonic reduction. The value of the fifth harmonic is induced equal to one-fifth the value of the first harmonic reduction.

Formulas for deriving such values are as follows:

Considering higher harmonic generation with various grind modes: In the 180 degree square wave grind mode, the amplitude of the harmonic content is calculated by the formula:

$$f(x) = \tfrac{1}{2} + (2/\pi) \sum_{n=1}^{n=\infty} (-1^n/n)\sin(n\pi/2)$$

where f(x) is the amplitude of the n th harmonic of the 180 degree square wave used to correct the tire.

The relative harmonic amplitudes from the above formula are calculated as:

| HARMONIC n | RELATIVE AMPLITUDE f(x) |
| --- | --- |
| 0 | .5 |
| 1 | −.64 |
| 2 | 0 |
| 3 | .21 |
| 4 | 0 |
| 5 | −.13 |

When a 180 degree square wave is used to remove a fundamental (n =1) force from a tire, there are no even harmonics induced. The amplitude of the higher order odd harmonics that are induced are inversely proportionate to the order of the higher harmonic. When the removal of a first harmonic force is processed by grinding with a 180 degree square wave, odd harmonics are also ground into the tire creating forces which may add or subtract from existing forces in the tire depending on the vector relationship of the induced forces to the forces which initially existed in the tire.

If a 90 degree square wave is used to remove the fundamental force from a tire, the amplitude of the induced forces is calculated from the formula:

$$f(x) = \tfrac{1}{2} + (2/\pi) \sum_{n=1}^{\infty} (-1^n/n)\sin(n\pi/4)$$

The relative harmonic content of the 90 degree square wave is calculated from the above formula as:

| HARMONIC n | RELATIVE AMPLITUDE f(x) |
| --- | --- |
| 0 | .25 |
| 1 | −.45 |
| 2 | .32 |
| 3 | −.15 |
| 4 | 0 |
| 5 | .09 |

It is seen that when a 90 degree square wave is used to grind away the rubber of a tire with the purpose of removing the first harmonic, a second harmonic of almost the amplitude of the first harmonic is induced into the tire. Again, this higher order frequency that is induced into the tire may add or subtract from the existing forces in the tire depending on the relative phase between the induced force and the existing force in the tire.

If a 270 degree square wave is used to remove the fundamental (or first) harmonic of force from a tire, the following formula is used to describe the amplitude of the frequency content of the 270 degree square wave:

$$f(x) = .75 + (2/\pi) \sum_{n=1}^{\infty} (-1^n/n)\sin(3n\pi/4)$$

The relative amplitudes of the induced harmonics as calculated from the above formula for a 270 degree square wave grind correction wave form are presented:

| HARMONIC n | RELATIVE AMPLITUDE f(x) |
|---|---|
| 1 | −.45 |
| 2 | −.32 |
| 3 | −.15 |
| 4 | 0 |
| 5 | .09 |

Grind signals are normally phased such that the first harmonic content of the waveform will cancel out of the existing first harmonic content of the composite waveform which is resident in the tire which is being corrected.

With equal amounts of 90 degree grind and 270 degree grind, the second harmonic contents of the two wave forms would cancel out and no second harmonic would be induced.

An often used waveform for correction of a tire is the 180 degree grind square wave. The following analysis will describe how it is superior to the 90 degree and the 270 degree square wave for the reduction of the first harmonic from a tire.

The 180 degree sine wave is another of the class of waveforms that are used to reduce the fundamental waveform content of a tire.

The Fourier expansion of the 180 degree sine wave function is described as:

$$f(t) = 1/\pi + (\tfrac{1}{2})\sin wt - (2/\pi) \sum_{n=2,4,6}^{\infty} (1/n^2 - 1)\cos nwt$$

The relative amplitudes of the induced harmonics as calculated from the above formula for a ½ sine wave are presented:

| HARMONIC n | RELATIVE AMPLITUDE f(t) |
|---|---|
| 0 | .32 |
| 1 | .5 |
| 2 | .21 |
| 3 | 0 |
| 4 | .04 |
| 5 | 0 |

A pure sine wave used to correct the tire has the formula:

$$f(t) = 1 + \sin wt$$

The relative amplitude of the harmonic content of this function is calculated as:

| HARMONIC | RELATIVE AMPLITUDE |
|---|---|
| 0 | .5 |
| 1 | .5 |
| 2 | 0 |
| 3 | 0 |
| 4 | 0 |
| 5 | 0 |

Each of the above wave forms may be selected by the user to perform force reduction of the fundamental force component of a tire depending on the requirements of the application. The first harmonic component of the above described waveforms is phase matched with the first harmonic component of the composite waveform which describes the force variation of the tire. The tire is then ground on the tread shoulder or face or a combination of the two in a manner that the first harmonic component of the ground tire cancels out the first harmonic component of the composite of the original tire force variation.

The special merit of each of the grind waveforms is described below. The operator or the computer will select the appropriate waveform to reduce the force depending on the criteria developed for the processing of that tire.

The merits of processing with each waveform are presented in the following table and then further discussed:

|  | 180 SQ. | 90 SQ. | 270 SQ. | 180 SINE | SINE |
|---|---|---|---|---|---|
| HARMONIC |  |  |  |  |  |
| 0 | .5 | .25 | .75 | .32 | 1 |
| 1 | −.64 | −.45 | −.45 | .5 | 1 |
| 2 | 0 | .32 | −.32 | .21 @ 45 | 0 |
| 3 | .21 | −.15 | −.15 | 0 | 0 |
| 4 | 0 | 0 | 0 | .04 @ 45 | 0 |
|  | .13 | .09 | .09 | 0 | 0 |
| CRITERIA |  |  |  |  |  |
| MAX 1/0 | 1.28 | 1.8* | .6 | 1.56 | 1 |
| MAX 1/(0 + 2 + 3 + 4 + 5) | .76 | .65 | .34 | .88 | 1 |
| NO 2 | X |  |  |  | X |
| NO 3 |  |  |  | X | X |
| MAX 1/(2 + 3 + 4 + 5) | 1.88 | .8 | .8 | 2 | INFINITE |
| MAX 1/RUBBER REMAINING | .64 | .45 | .45 | .5 | .5 |

If the criteria is to maximize the amount of first harmonic removed with respect to the amount of 0 component removal, then the 90 degree square wave would be used. This criteria may minimize the total amount of rubber removed from the tire.

If the criteria is to maximize the amount of first harmonic removal with respect to the sum of all other harmonics including the 0 component, then either 180 degree sine or pure sine wave processing would be selected.

If the criteria is to not introduce any second harmonics during the processing, then the 180 degree square wave or the pure sine wave would be used. This may be of advantage when tuning the tire to a particular vehicle.

If the criteria is to not introduce any third harmonics, then the 180 degree sine wave or the pure sine wave processing would be used. This may be of advantage when tuning the tire to a particular vehicle.

If the criteria is to maximize the ratio of first harmonic remove to that of all other frequencies, then the 180 degree square or the 180 degree sine or the pure sine wave method would be used to process the tire.

If it is required to maximize the amount of first harmonic removal to the maximum penetration of the grinder into the tire, then the 180 degree square wave would be used.

From the above analysis, it is seen that each of the above waveforms has special merit when the criteria for the force removal of the first harmonic of force of a tire is established.

Adaptive Offset and Adaptive Gain

With regard to adaptive offset and adaptive gain, FIGS. 9A, 9B, 9C and 9D are the flow diagrams for achieving this objective to accommodate the contemplated increase in content of the master control menu. The proposed revised master control menu is as follows:
1. Harmonic Grind Limit
2. Composite Grind Limit
3. Upper Grind Offset
4. Lower Grind Offset
5. Upper Composite Grind Gain
6. Lower Composite Grind Gain
7. Grind Maximum Level
8. Polish Grind Offset
9. Harmonic Grind Gain
10. Grind Patch Width Factor
11. Grind Ramp Limit
12. Conicity Offset
13. High Point Marker Delay
14. Delay of Grind
15. Tire Type
16. Spindle Speed
17. D/A Output
18. A/D Radial Input
19. A/D Lateral Input
20. Digital Inputs
21. Digital Outputs Items to change;

On 17: The computer should query? (1) RC, (2) RH, (3) LC, or (4) LH?

On 15: The computer should query? (1) Small Block, (2) Small Block, or (3) Rib?

Figure 9:
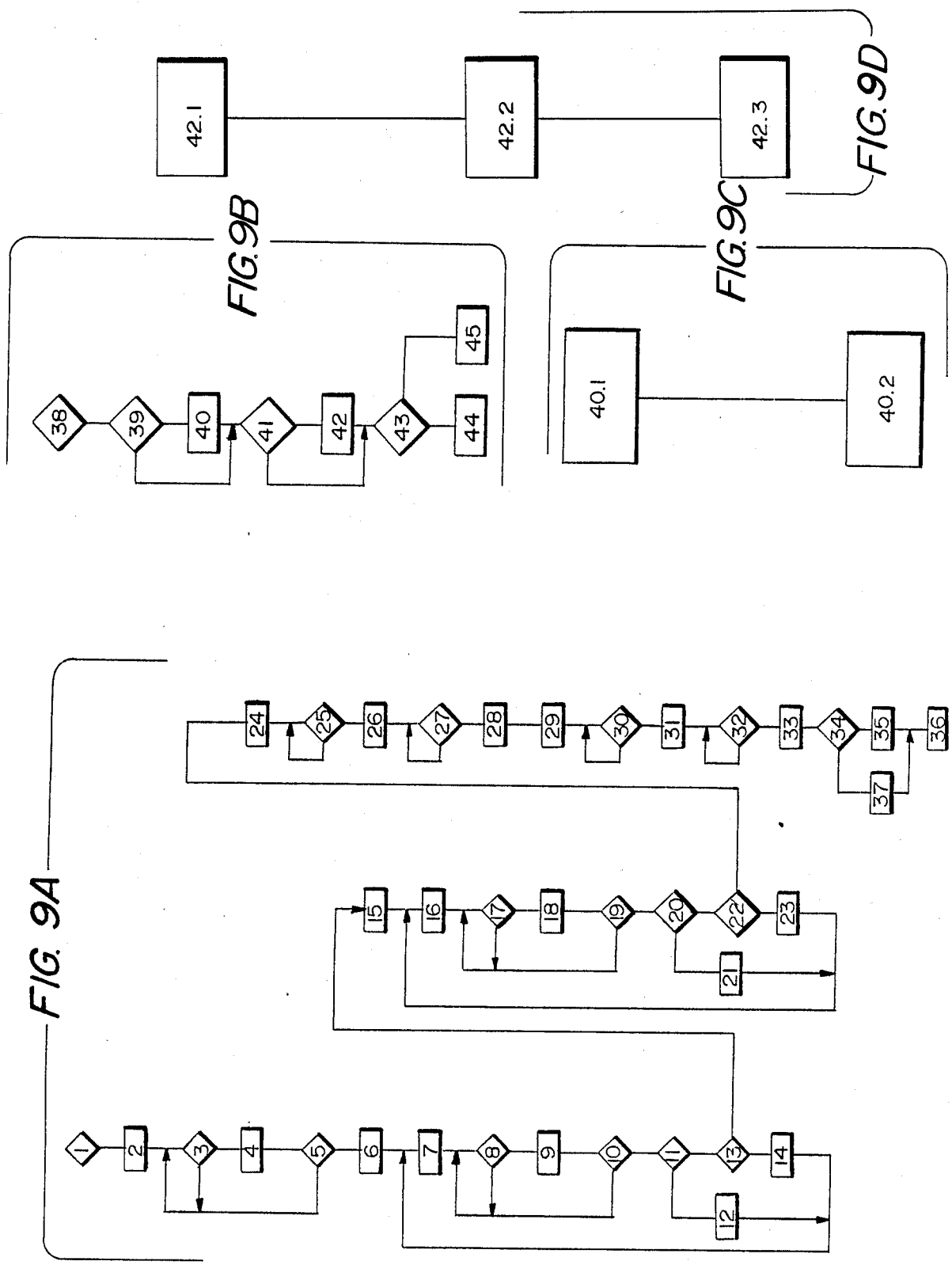
FIGS. 9A, 9B, 9C and 9D are block diagrams of the computer program for adaptive offset grinding.
Figure 10:
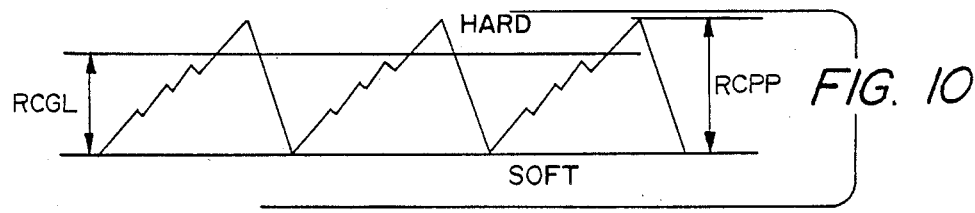
FIG. 10 is a graph of a radial composite peak-to-peak force.

An overview of the grind process compared with FIG. 9B is as follows:

at 38, grind request;

at 39, does the RCPP force exceed the composite grind limit, CGL;

at 40, calculate the optimum composite grind waveform;

at 40.1, calculate a composite grind mode suppressed limit where CGMSL equals CGL minus 2 minus 0.2 (CPP minus CGL);

at 40.2, calculate the grind wave required to profile the grinders into the tire. The gain shall be one-hundred percent (100%) unless in the gain adaptive mode;

at 41, does the RHPP force exceed the harmonic grind limit, HGL;

at 42, calculate the optimal harmonic grind waveform and calculate the required harmonic gain multiplier (HGM) required to reduce the harmonic force to the harmonic grind limit, HGL;

at 42.1, calculate a harmonic grind mode suppressed limit where HGMSL equals the average of composite radial force and HGMSL equals RF divided by n;

at 42.2, calculate the harmonic grind multiplier required to reduce the harmonic force where HGM equals 2 (HF minus HGL) divided by HF;

at 42.3, calculate the optimal harmonic grind waveform;

at 43, will the calculated composite grind mode removal result in reducing the harmonic force to the harmonic grind limit;

at 44, use CGM to perform grind;

at 45, use HGM to perform grind;

In the foregoing, (1) RCPP is the radial composite peak-to-peak force as shown in FIG. 10.

(2) RCGL is the process specified composite grind limit. This is usually one (1) or two (2) pounds below the composite grading limit. This is to get a conservative grind during the process, the force removed more than exceeds required force removal.

(3) RHPP is the calculated radial first harmonic force content of the radial composite waveform.

(4) RHGL is the process specified harmonic grind limit. This is usually one (1) or two (2) pounds below the harmonic grading limit with the objective of over-grinding slightly n compensate for machine variance.

(5) HGM is the harmonic grind multiplier used in synthesizing the optimal harmonic grind waveform.

(6) HGSL is the harmonic grind suppressed limit calculated as the average of the composite waveform. If the composite waveform above the HGSL was used at one-hundred percent (100%) gain in synthesizing the grind waveform, the fifty percent (50%) of the first harmonic content cf the tire would be removed. If a gain of fifty percent (50%) is used, then twenty-five percent (25%) of the first harmonic content would be removed.

(7) The basic ideas used in the adaptive grind algorithms presented are as follows:

(A) The offset parts of the synthesized grind waveforms are used to bring the upper and lower grinders into contact with the tire such that there is some expectation that force removal will be proportionate to the grind profile into the tire. The machine is calibrated such that with a gain of one-hundred percent (100%), a 0.001 increment into the tire would occur with a voltage of 0.1 volts which is scaled to represent one (1) pound of force. The initial assumption is that the spring constant of the tire is one (1) pound per 0.001 inches.

The computer is to be programmed so as to adaptively correct this assumption of a spring constant as the result of subsequent sequential measurements and grind force removals.

(B) One of the limiting factors to obtaining an exact correlation between grind profile and force removal is the integrating effect of the loadwheel. Tire force spikes are averaged out in the composite waveform which is used to synthesize the grind waveform.

(C) A second limiting factor is the assumption that the tire spring constant, i.e., relationship between rubber removed and force, is a constant. In this case a second order least squares regression is used to automatically correct the assumed relationship between penetration into the tire (of a given function type) and radial force removed.

Advanced Uniformity Computer

In the Advanced Uniformity Computer, the escape processor can be entered anytime from normal operation by hitting the "esc" key. This key stroke is only honored if the machine is not in a test or grind mode.

The computer only tests and grinds tires if it is in normal operation, number four (4) on the menu. The master control menu is entered by typing a "1" followed by a carriage return.

The harmonic mode should be used with caution. All analog output signals are enabled and continuously outputted. This feature allows maintenance to determine if the computer channels correspond to actual radial inputs, and the location of the harmonic marks. This mode must be turned off when grinding or testing production tires. The harmonic waveforms are only updated during the grind cycle.

The time clock is set by entering a "5".

1. First Harmonic Suppress Limit.

This value is subtracted from the computer generated first harmonic waveform and the difference is added into the grind output buffer. If the difference is negative, the grind buffer is filled with zero. If the difference is positive, the value is placed into the grind buffer. The value is ORed with any other previous value. (Adaptive grind function). Whatever value is greater, remains in the output buffer. It is normally set five (5) to seven (7) pounds below the class A limit.

2. Second Harmonic Suppress Limit.

This value is subtracted from the computer generated first harmonic waveform and the difference is added into the grind output buffer. If the difference is negative, the grind buffer is filled with zero. If the difference is positive, the value is placed into the grind buffer. The value is ORed with any other previous value. (Adaptive grind function). Whatever value is greater, remains in the output buffer.

3. Composite Suppress Limit.

This value is subtracted from the actual radial composite waveform and the difference is added into the grind output buffer. If the difference is negative, the grind buffer is filled with zero. If the difference is positive, the value is placed into the grind buffer. The value is ORed with any other previous value. (Adapted grind function). Whatever value is greater, remains in the output buffer. To disable the composite grind, raise the Composite Suppress Limit to ninety-nine (99) pounds. It is normally set five (5) to seven (7) pounds below the Class A limit.

4. Upper Grinder Offset.

The value represents the amount of additional offset for the upper grinder to compensate for skim distance between the upper grinder and the tire. During adaptive setup, this value starts off at zero and increases by the adaptive grind increment thirty-seven (37) until one (1) pound harmonic force is removed from the tire per grind by the upper grinder only.

5. Lower Grinder Offset.

The value represents the amount of additional offset for the lower grinder to compensate for skim distance between the lower grinder and the tire. During adaptive setup, this value starts off at zero and increases by the adaptive grind increment thirty-seven (37) until one (1) pound harmonic force is removed from the tire per grind by the lower grinder only.

6. Spring Rate Grind Gain.

The value represents the percentage amount of the grind buffer content that will be used by the upper and lower grinders. This value is typically one-hundred percent (100%). If the grinders are over grinding, adjust the grind max limit first (Item 8).

7. Offset Preact.

In the non-polish/composite grind mode, the value represents the number of degrees that the grind offset is applied to the tire before performing the actual grind. This value is added to the front of the grind patch waveform. In the polish/composite grind mode, the value represents the number of degrees that the polish plus grind offset is applied to the tire after three-hundred and sixty degrees (360°) has passed.

8. Grind Max Limit.

The value represents the maximum position that can be exerted by the grinders. If the grind buffer content has values that exceed this amount then the grind buffer content values are clipped to the max level. If this occurs, an additional grind pass might be needed.

11. Polish Grind Offset.

The grind output buffer content is filled with this offset for three-hundred and sixty degrees (360°). The upper and lower offsets do not effect this function. The intention of the offset is to produce a smooth appearance on the tread surface, without affecting the tire parameters. A visible tire check confirms correct entry.

12. Harmonic Grind Gain.

This parameter is no longer used by the computer and should stay set at zero.

13. Grind Patch Width.

This parameter determines how wide the grind patch is for harmonic grinding. This item is no longer used and should be set at zero.

14. Grind Ramp Limit.

This parameter determines how fast the grind output waveform can change per degree of grind. This includes both negative and positive rate changes. If the grind buffer contents exceed this rate, then the grind waveform is modified so that notching or steps into the tire is minimized.

9. Conicity Gain.

This parameter determines the percentage of calculated conicity that will be displayed on the screen. In most cases, the value should be one-hundred percent (100%). This value should only be changed after consultation with quality control.

10. High Point Marker Delay.

The entered delay represents the number of clockwise degrees between the loadwheel and the high point marking mechanism. It also includes a factor for the reaction time of the high point marker. The high point mark is enabled after a completed test cycle.

15. Delay of Grind.

The entered delay represents the number of clockwise degrees between the loadwheel and the grinders. An incorrect value could affect the radial forces after grinding.

16. Calculated Polish Gain.

This parameter cannot be changed. It represents the calculated gain as follows:

$$G = \frac{\text{(Radial first Peak} - \text{Peak} - \text{Radial Suppressed Limit)}}{\text{Radial first Peak to Peak}}$$

This value is only calculated if the Polish/Composite switch is on. The gain is multiplied against the first harmonic waveform and added to the grind output buffer. If the suppressed limit exceeds the Peak to Peak values a minimum of 0.2 Volts sine wave is added to the grind buffer.

17. Polish/Composite Grind (1 - On).

If the value is one (1), each grind output will contain the following: The grinder offset plus a ramped in polish offset value. A three-hundred and sixty degree (360%) sine wave is added using item sixteen (16) as the gain on the waveform. Then the composite waveform is ORed to the grinder output buffer. The polish offset is left on for the number of degrees specified of the offset preact after three-hundred and sixty degrees (360%) have passed.

18. D/A Radial First Harmonic (Cnts).

The value represents the "count" value for board analog output calibration of the radial first harmonic signal. Two-thousand and forty-eight (2048) counts represents ten (10) volts.

19. D/A Radial Second harmonic (Cnts).

The value represents the "count" value for board analog output calibration of the radial second harmonic signal. Two-thousand and forty-eight (2048) counts represents ten (10) volts.

21. 0-100 1-200 Lbs Scale (Num).

A "1" and a "0" are the only valid responses for this field. A "1" (0-200) indicates that two-hundred (200) pounds equals ten (10) volts while a "0" (0-100) indicates that one-hundred (100) pounds equals ten (10) volts. Whenever the two-hundred (200) pound scale is selected items 1, 2, 3, 11, 22 and 37 double the screen displayed values. Items 4, 5, 8 and 9 are halved. In actuality, none of the internal registers are changed. A "0" is entered on all machines having a one-hundred (100) pound range for radial and lateral measurements.

22. D/A Upper Grinder.

Represents the last force applied to the upper grinder in D/A counts.

23. D/A Lower Grinder.

Represents the last force applied to the lower grinder in D/A counts.

24. D/A Conicity.

Represents the output volt value in D/A counts on the conicity channel on the DT 1751 card.

25. A/D Radial Input.

Displays the last radial input value into the computer during a test cycle. The value is represented in counts.

26. A/D Lateral Input.

Analog board "count" value (0-4096) of the level of the lateral signal. O represents minus ten (−10) volts and 4096 represents plus ten (+10) volts.

27. Digital Inputs.

The status of the digital input port from the PLC and ICS one-hundred (100) is displayed here. This offers a convenient way of testing I/O lines from the external world.

28. Digital Outputs.

The status of the digital output port to the PLC and ICS one-hundred (100) is displayed here. This offers a convenient way of testing I/O lines from the external world.

29. Average Lateral Force CW.

Contains the analog count value of the average clockwise lateral force.

30. Average Lateral Force CCW.

Contains the analog count value of the average counterclockwise lateral force.

31. Motor Preact.

Represents the number of degrees anticipated for the motor to achieve slow speed.

32. Plysteer Force.

Computed by subtracting the counterclockwise lateral average from the clockwise average and dividing by two (2). Usually a positive value.

33. Max Lateral.

Represents the maximum lateral force seen by the computer. Intended for diagnosing high lateral readings.

34. Min Lateral.

Represents the minimum lateral force seen by the computer. Intended for diagnosing high lateral readings.

35. Grindstatus.

A number from zero (0) to ten (10) referencing the sequence number for automatic grinder setup. 0 and 1 - lower grinders. 2, 3 - for upper grinders. 4 - lower grinder in, 5 - upper grinder in. In phases 0 and 1 and 2 and 3, the grinder performs a harmonic grind for one-hundred and eighty degrees (180%). If a pound harmonic force is not removed, the amount of applied force increases by the adaptive grind increment. This procedure is done for the lower grinders first then the upper grinders. To determine if the grinders are properly setup, steps 4 and 5 engage each grinder separately. If the amount of force removed compares within the grind Cal error limit, the grinders are considered calibrated.

36. Adaptive Grind Inc.

A number used to compute how much extra force is used for each grinder setup phase in Grindstatus steps 0, 1, 2 and 3.

37. Grind Cal Error Limit.

A value in pounds used to determine if the grinders are properly calibrated In the last phase of grind setup, each grinder goes in separately and removes some force. If the two (2) force removed values are not within the error limit, the computer turns on a bit indicating setup error.

38. Machine Number.

A numeric value identifying the TUO that the system is operating with. The data can be transmitted over the printer port. The data can be transmitted over the printer port. This value does not affect machine operation.

39. Printer Switch.

Three (3) values are available for this item. A zero (0) results in no printer port output. A one (1) indicates that machine number, tire code, composites and harmonics will be transmitted over the printer port. A two (2) allows the menu setup page to be outputted to the printer during power up, or whenever the menu mode has been entered. No other data will be transmitted.

40. Tire Code.

A four (4) character alpha numeric code transmitted to the printer.

41. Control Menu Save.

If a "1" is entered, the computer saves all the entered tire parameters during power failure. The main reason for this feature is that different plants have various settings so, instead of changing the software to get default values, the values are retained by a battery backup board. Whenever a new software version is released, set this byte to "0" and repower the computer, otherwise odd values might appear for some parameters.

42. Dual Direction.

With a "0" value, the computer updates the radial forces meter readings in the clockwise direction only. If a "1" is entered, the computer updates the clockwise and counterclockwise readings. The computer always updates the CRT display for either direction. Conicity is not effected by this parameter.

Figure 17:
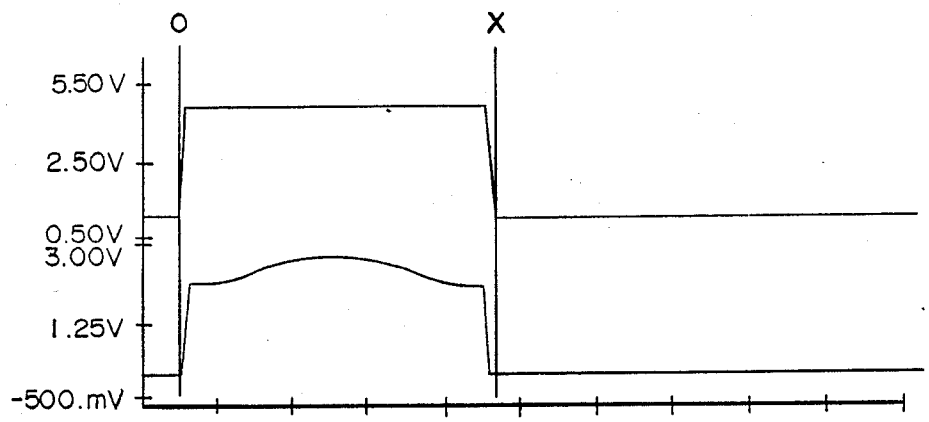
FIGS. 17 and 18 are a series of grind waveforms showing the different force problems on a tire.

FIG. 17 is an example setup of the control menu. Each tire might need a different menu setup. Failure to recognize this will cause an increase in scrap tires.

Figure 18:
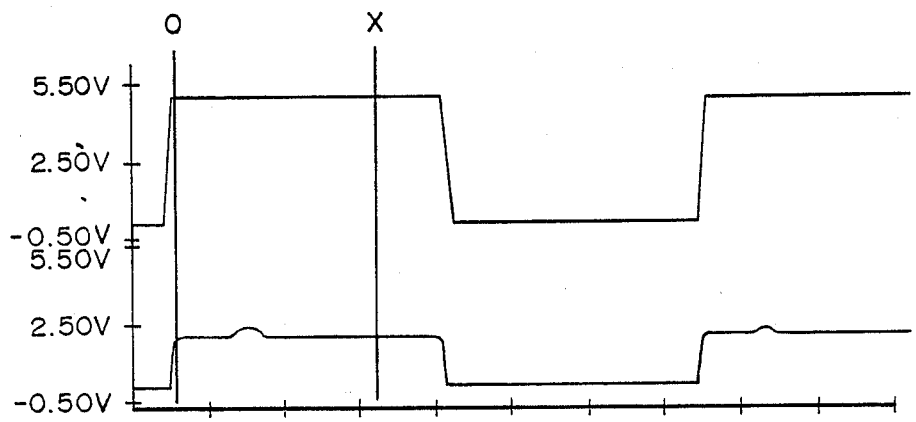

FIG. 18 is a series of grind waveforms showing the different force problems on a tire.

Adaptive Gain

Also included herein are circuits for incorporating adaptive offset and adaptive gain as well as the use of adaptive grinding methods into the sequential set up of the machine.

Adaptive gain as used includes retention of the last ten (10) tires which had grind profiles not exceeding the maximum grind limit.

Figure 11:
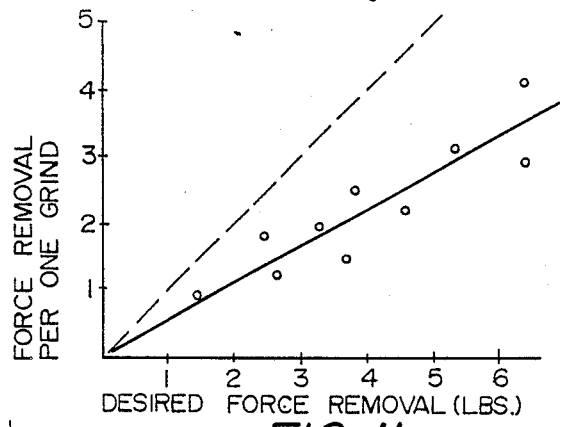
FIGS. 11 and 12 are graphs of the force removed during one grind versus the desired force removal in pounds.
Figure 12:
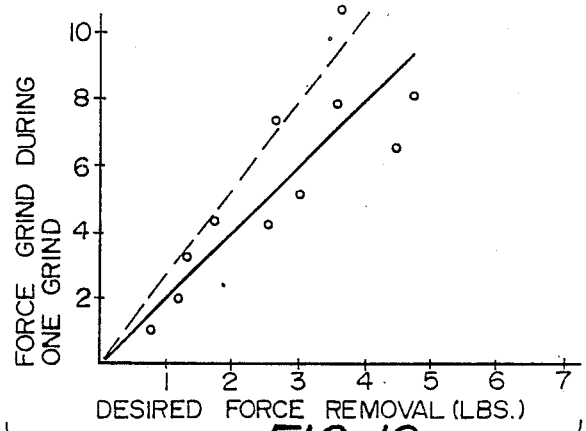

A least squares fit is applied sequentially as the tires are processed with a feed back to vary the gain of the waveform which is added to the offset in order to grind the tire. FIGS. 11 and 12 illustrate the process of providing predictive grind in order to correct tires with minimum rubber removal.

Adaptive Grind

Hereinabove are described optimal grind waveforms for simultaneous reduction of RC, RH and RH2. Regression of force reduction against excess force is also described as a means of adaptively adjusting grind waveform gain.

The expectation of RC and RH force reduction when using optimal grind means must be examined when regression for adaptive correction of grinder gain is performed:

(1) If there is excessive RC and RH, then the expectation is that they are both reduced to the setpoint. There is further expectation that simultaneous RH and RC reduction may cause excessive RC reduction (when the envelope of excess RH encompasses the maximum value of Excess RC) or it may cause excessive RH reduction (when the excess RC waveform is outside the envelope of the excess RH waveform but is within +ninety (90) degrees of the harmonic hard spot).

(2) If exclusive excess RC force is processed, then the RC force removed shall be statistically processed for adaptive gain as described hereinabove.

(3) If exclusive excess RH force is processed, then the RH force removed shall be statistically processed for adaptive gain as described hereinabove.

(4) The statistics of excess RH and RH removed may be regressed in the same statistics with excess RC and RC removed since both are in pounds.

Adaptive Grinding Methods

When performing regression for determination of automatic gain of the grind waveform, other value 1/m is used as the gain update term where the regression of force removed to desired force removal is of the form: force removed equals K plus M (desired force removal). In the method applied, the last ten (10) grind operations are used to determine the regression and a new value of gain is substituted for the subsequent process.

The anticipated result of this is that fifty percent (50%) of the grind processes would result in excessive force removed and fifty percent (50%) of the grind processes would result in insufficient force removal.

Figure 13:
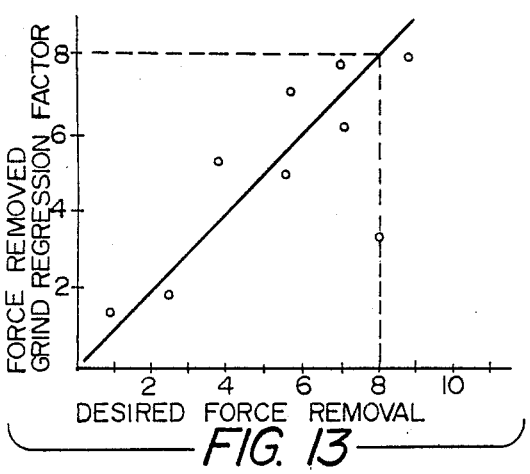
FIGS. 13 and 14 are the force removed and force removed per grind regression factor measured against the desired force removal.
Figure 14:
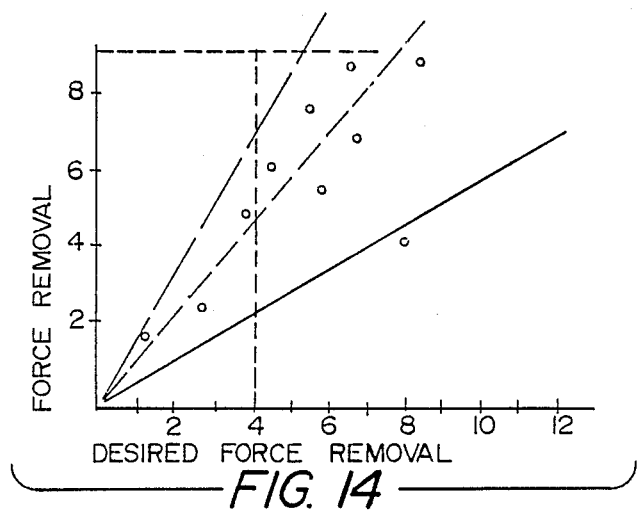

It is the purpose of this invention to record to describe how a different percentage of grind processes may be controlled to occur with excessive force removed. Note FIGS. 13 and 14.

The method is to include a table look up grind regression factor. This factor may be any value between 0.1 and 10. If the grind regression factor is 1, then the process will run with fifty percent (50%) of the grind regression factor prior to the least squares regression. If the grind regression factor is greater than 1, then greater than fifty percent (50%) of the grind processes will result in excessive force removal.

Optimal Grind Waveform

Also employed herein is the use of optimal predictive grind waveform.

Figure 15:
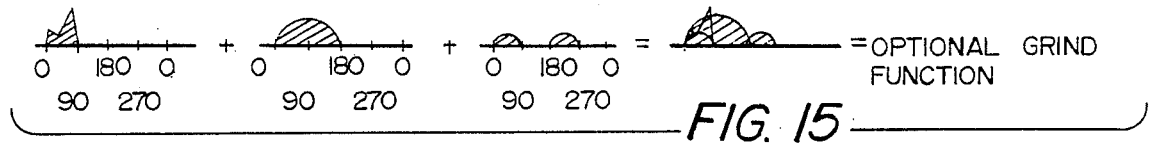
FIG. 15 illustrates graphs for generating an optimal grind function waveform.

The relationship of the addition of the various waveforms to optimal grind function are shown in FIG. 15.

A method of constructing an optimal predictive grind waveform is presented which sums the excess composite grind waveform and the excess harmonic waveform to permit simultaneous proportionate reduction of composite and harmonic radial forces in a tire. The excess composite waveform as a function of 0 is determined and the excess first harmonic waveform as a function of 0 is determined. The excess waveforms of any selected higher harmonics is also determined. The greater of these excess values of composite, first harmonic and selected higher harmonics as a function of 0 (or tire location) is used to generate a grind function.

Slow Speed Grind Concentricity Grinding

Another feature of the invention is the applying of the predictive method to concentricity grinding.

The center grinder on a uniformity machine or the grinder on a concentricity machine are used to educe the first harmonic of runout (ROH) of light truck tired during final finish processing of these tires as currently practiced in the industry.

With the successful development of tools and methods for slow speed grind as described hereinabove, an extension of these previously described methods is proposed to permit more efficient and cosmetic grinding for reduction of first harmonic of runout. A repetitive composite waveform describing the runout is described by FIG. 16.

Figure 16:
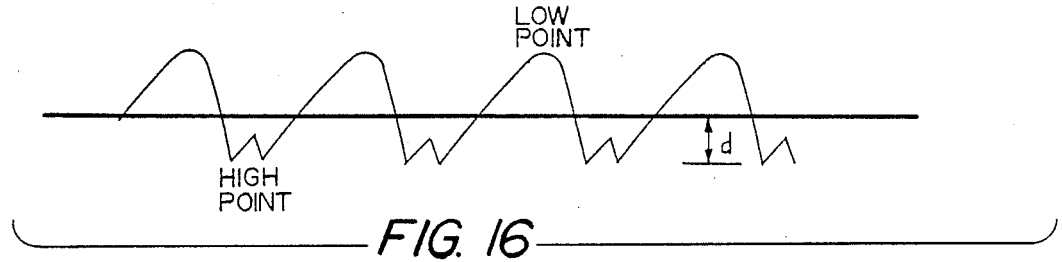
FIG. 16 is a repetitive composite waveform describing the runout and illustrating the high and low points for use in predictive first harmonic reduction.

The first harmonic content may be calculated using Fourier methods where ROH is set out in the formula of FIG. 16.

The grinder is initially located at the high point of the tire.

The initial ROH is calculated with d - 0.

The desired ROH is known.

The computer is programmed to iteratively increment and recalculate the ROH until a value of d is established which results in a waveform for which the calculated for is equal to the desired ROH.

The grinder is then positioned into the tire a distance equal to d.

The desired ROH is thus attained in single revolution or less of grinding without overgrind.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A method of processing a tire comprising the steps of:
   sensing force variations in the tire to be processed, such force variations including radial run-out induced variations.
   creating a first waveform which is a composite of the sensed force variations in the sensed tire;
   separating the first waveform into a plurality of second waveforms which are special waveforms corresponding to intended specifications of the tire to be processed;
   generating third waveforms which are functions of the second waveform;
   combining the third waveforms which are functions of the second waveforms;
   combining the third waveforms into a fourth waveform; and
   grinding the tire to be processed in a pattern as determined by the fourth waveform.

2. The method as set forth in claim 1 wherein the plurality of second waveforms include composite, first harmonic, second harmonic through the nth harmonic.

3. The method as set forth in claim 1 wherein the third waveforms include excess composite waveforms, partial harmonic waveforms, full harmonic waveforms and 180 degree sine waveforms.

4. The method as set forth in claim 1 and further including the steps of modifying at least one of the waveforms as a function of the process results from the processing of prior tires.

5. The method as set forth in claim 4 wherein the modifying is done to the fourth waveform.

6. The method as set forth in claim 1 and further including the step of determining the position of the tire being processed with respect to the grinding means and off-setting at least one of the waveforms as a function of such determined position.

7. The method as set forth in claim 1 wherein the force variations being sensed are radial force variations.

8. The method as set forth in claim 1 wherein the variations being sensed are the radial runout induced variations.

9. The apparatus as set forth in claim 1 and further including means to modify at least one of the waveforms as a function of the process results from the processing of prior tires.

10. The apparatus as set forth in claim 9 wherein the means to modify acts upon the fourth waveform.

11. A method of processing a tire comprising the steps of:
    sensing the radial force variations in the tire to be processed;
    creating a first waveform which is a composite of the sensed force variations in the sensed tire;
    separating the first waveform into a plurality of second waveforms which are special waveforms corresponding to intended specifications of the tire to be processed;
    generating third waveforms which are functions of the second waveforms;
    combining the third waveforms into a fourth waveform;
    modifying the fourth waveform as a function of the process results from the processing of prior tires;
    off-setting all of the waveforms as a function of the position of the tire being processed with respect to the grinding means; and
    grinding the tire to be processed in a pattern as is determined by the fourth waveform.

12. Apparatus for processing a tire comprising in combination:
    means to sense force variations in the tire to be processed, such force variations including radial run-out induced variations;
    means to create a first waveform which is a composite of a sensed force variations in the sensed tire;
    means to separate the first waveform into a plurality of second waveforms which are special waveforms corresponding to intended specifications of the tire to be processed;
    means to generate third waveforms which are functions of the second waveforms;
    means to combine the third waveforms into a fourth waveform; and
    means to grind the tire to be processed in a pattern as determined by the fourth waveform.

13. The apparatus as set forth in claim 12 wherein the plurality of second waveforms include composite, first harmonic, second harmonic through the nth harmonic.

14. The apparatus as set forth in claim 12 wherein the third waveforms include excess composite waveforms, partial harmonic waveforms, full harmonic waveforms and 180 degree sign waveforms.

15. The apparatus as set forth in claim 10 and further including means to determine the position of the tire being processed with respect to the grinding means and means to off-set at least one of the waveforms as a function of such determined position.

16. The apparatus as set forth in claim 10 wherein the force variations being sensed are radial force variations.

17. The apparatus as set forth in claim 10 wherein the variations being sensed are the radial run-out induced variations.

18. Apparatus for processing a tire comprising in combination:
    means for sensing radial force variations in the tire to be processed;
    means for creating a first waveform which is a composite of the force variations in the sensed tire;
    means for separating the first waveform into a plurality of second waveforms which are special waveforms corresponding to intended specifications of the tire to be processed;

means for generating third waveforms which are functions of the second waveforms;

means for combining the third waveforms into a fourth waveform;

means for modifying the fourth waveform as a function of the process results from the processing of prior tires;

means for determining the positioning of the tire being processed with respect to the grinding means and off-setting all of the waveforms as a function of such determined position; and grinding the tire to be processed in a pattern as determined by the fourth waveform.

19. A method of processing a rotating tire comprising the steps of: sensing force variations in the rotating tire to be processed;

creating an initial waveform which is a composite of the sensed force variations in the rotating tire;

separating the initial waveform into a plurality of intermediate waveforms;

processing at least some of the intermediate waveforms;

combining processed waveforms into a final waveform; and grinding the rotating tire to be processed in a pattern as determined by the final waveform.

* * * * *

UNITED STATES PATENT AND TRADEMARK OFFICE
CERTIFICATE OF CORRECTION

PATENT NO. : 4,936,054

DATED : June 26, 1990

INVENTOR(S) : Clarence L. Rogers, Farhad Tabaddor

It is certified that error appears in the above-identified patent and that said Letters Patent is hereby corrected as shown below:

```
Column 21, Claim 1,  Line 27 "." should read -- ; --
Column 21, Claim 9,  Line 65 "1" should read -- 12 --
Column 22, Claim 12, Line 31 "of a" should read -- of the --
Column 22, Claim 14, Line 48 "sign" should read -- sine --
Column 22, Claim 15, Line 49 "10" should read -- 12 --
Column 22, Claim 16, Line 54 "10" should read -- 12 --
Column 22, Claim 17, Line 56 "10" should read -- 12 --
```

Signed and Sealed this

Twenty-eighth Day of April, 1992

Attest:

HARRY F. MANBECK, JR.

*Attesting Officer*  *Commissioner of Patents and Trademarks*